US012574252B1

(12) United States Patent
Yilmaz et al.

(10) Patent No.: US 12,574,252 B1
(45) Date of Patent: Mar. 10, 2026

(54) METHOD AND HARDWARE FOR ACCELERATED TEST-DATA AUTHENTICATION

(71) Applicant: NVIDIA Corporation, Santa Clara, CA (US)

(72) Inventors: Mahmut Yilmaz, Los Altos Hills, CA (US); Smbat Tonoyan, Los Gatos, CA (US); Sailendra Chadalavada, Saratoga, CA (US); Mengyun Liu, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 33 days.

(21) Appl. No.: 18/828,392

(22) Filed: Sep. 9, 2024

(51) Int. Cl.
*G06F 21/16* (2013.01)
*H04L 9/32* (2006.01)

(52) U.S. Cl.
CPC .................................. *H04L 9/3249* (2013.01)

(58) Field of Classification Search
CPC ...................................................... H04L 9/3249
See application file for complete search history.

(56) References Cited

U.S. PATENT DOCUMENTS

| | | | | |
|---|---|---|---|---|
| 12,388,640 | B2 * | 8/2025 | Watanabe | .................. H04L 9/50 |
| 2020/0287707 | A1 * | 9/2020 | Wilke | .................... H04L 9/0643 |
| 2020/0356085 | A1 * | 11/2020 | Wentz | .................... H04L 9/0866 |

* cited by examiner

*Primary Examiner* — Normin Abedin

(57) ABSTRACT

An integrated circuit (IC) is disclosed. In one embodiment, the IC comprises a memory and at least one processing core coupled to the memory. In one embodiment, the operations the at least one processing core operatively coupled to the memory perform comprise storing final hashes of each block chain authentication (BCA) section of an in-system test (IST) image in a write-protected portion of the memory; receiving at least one Public Key Authentication (PKA) signature; authenticating the at least one PKA signature using public key cryptography (PKC) algorithm; once the PKA signature is authenticated, using the final hash for each BCA section to authenticate a portion of the IST image associated with each BCA section using a hash engine of the at least one processing core skipping any PKA signature checks for any of the final hashes; and testing portions of the IC with the authenticated IST image portion.

23 Claims, 6 Drawing Sheets

START
610

STORE FINAL HASHES OF EACH BCA SECTION OF AN IST IMAGE IN A WRITE-PROTECTED PORTION OF A MEMORY OF AN IC
620

RECEIVE AT LEAST ONE PKA SIGNATURE
630

IS PKA SIGNATURE AUTHENTICATED
640

N

Y

USE FINAL HASH FOR EACH BCA SECTION TO AUTHENTICATE PORTION OF IST IMAGE ASSOCIATED WITH BCA SECTION SKIPPING ANY FURTHER PKA SIGNATURE CHECKS
650

TEST PORTIONS OF IC WITH AUTHENTICATED IST IMAGE PORTION
660

STOP
670

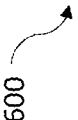

METHOD AND HARDWARE FOR ACCELERATED TEST-DATA AUTHENTICATION

TECHNICAL FIELD

This application is directed, in general, to a method and hardware for accelerated test-data authentication, more specifically, to a method and hardware to collapse block chain authentication signatures into a single signature.

BACKGROUND

Manufacturers test integrated circuits (ICs) before shipping to determine if the ICs are functioning properly and whether there are any manufacturing defects such as structural faults. Automated test equipment (ATE) is used to perform testing for these structural faults on ICs before shipment of the IC. As more ICs are used in products tasked with handling safety critical operations (e.g., autonomous driving), it is becoming more important to also check and ensure that such ICs are free from structural faults that can occur after the IC is placed in operation during a lifetime of a product using the IC.

To address this need to test ICs after shipment while in actual use with the IC functioning as desired, in-system test (IST) for testing these ICs in operation can detect structural faults of the IC. Run-time IST (RIST) is a specific application of IST, where a portion of the IC is tested by IST logic while the rest of the IC continues its functional operation. Automotive RIST has very stringent Fault-Tolerant Time Interval (FTTI) requirements to obtain Automotive Safety Integrity Level (ASIL) certifications. More specifically, all CPU processing cores are required to be tested every ~100 ms to achieve minimum 90% test coverage. RIST cannot take all the processing cores offline at the same time to test them since that would make the system non-functional. To minimize the performance impact of RIST to the overall system, RIST tests one processing core at a time. For example, in an IC with 14 processing cores, each processing core has around 4-5 ms for RIST execution time once software (SW) overheads are excluded. Obtaining more than 90% test coverage in such a short period of time is very challenging by itself but the latency added by block chain authentication (BCA) checks for test-data authentication further erodes available net time for test execution. In its original implementations, BCA check latency accounts for more than 10% of RIST execution time. This overhead makes achieving test coverage targets within the FTTI window not feasible. Furthermore, any latency introduced by BCA is lost CPU performance in functional operation since functional operation cannot be executed on that CPU as long as RIST execution is not completed.

SUMMARY OF THE DISCLOSURE

In one aspect, an integrated circuit (IC) is disclosed. In one embodiment, the IC comprises a memory and at least one processing core coupled to the memory to perform operations. In one embodiment, the operations performed by the at least one processing core operatively coupled to the memory perform comprise storing final hashes of each block chain authentication (BCA) section of an in-system test (IST) image in a write-protected portion of the memory; receiving at least one Public Key Authentication (PKA) signature; authenticating the at least one PKA signature using public key cryptography (PKC) algorithm; once the PKA signature is authenticated, using the final hash for each BCA section to authenticate a portion of the IST image associated with each BCA section using a hash engine of the at least one processing core skipping any PKA signature checks for any of the final hashes; and testing portions of the IC with the authenticated IST image portion.

In another aspect, a method is disclosed. In one embodiment, the method comprises storing final hashes of each BCA section of an IST image for an IC in a write-protected of a memory of a memory of the IC; receiving at least one Public Key Authentication (PKA) signature; authenticating the at least one PKA signature using a PKC algorithm; once the PKA signature is authenticated, using the final hash for each BCA section to authenticate a portion of the IST image associated with each BCA section using a hash engine of the IC skipping any PKA signature checks for any of the final hashes; and testing portions of the IC with the authenticated IST image portion.

In still another aspect, a non-transitory computer-readable storage medium is disclosed. In one embodiment, the non-transitory computer-readable medium comprises instructions that, when executed by a processing device, cause the processing device to perform operations. In one embodiment, the operations performed comprise storing final hashes of each BCA section of an IST image for an IC in a write-protected portion of a memory of the IC; receiving at least one Public Key Authentication (PKA) signature; authenticating the at least one PKA signature using a PKC algorithm; once the PKA signature is authenticated, using the final hash for each BCA section to authenticate a portion of the IST image associated with each BCA section using a hash engine of the IC skipping any PKA signature checks for any of the final hashes; and testing portions of the IC with the authenticated IST image portion.

In yet another aspect, an autonomous driving system is disclosed. In one embodiment, the autonomous driving system comprises a plurality of ICs. In one embodiment at least one of the plurality of ICs comprise a memory and at least one processing core operative coupled to the memory. In one embodiment, the operations performed by the at least one processing core comprise storing final hashes of each BCA section of an automotive run-time IST (RIST) image in write-protected portion of the memory; receiving at least one Public Key Authentication (PKA) signature; authenticating the at least one PKA signature using a PKC algorithm; once the PKA signature is authenticated, using the final hash for each BCA section to authenticate a portion of the automotive RIST image associated with each BCA section using a hash engine of the at least one processing core skipping any PKA signature checks for any of the final hashes; and testing portions of the at least one of the plurality of ICs with the authenticated automotive RIST image portion.

In still yet another aspect, a server of a data center is disclosed. In one embodiment, the server of the data center comprises a plurality of ICs. In one embodiment at least one of the plurality of ICs comprise a memory and at least one processing core operative coupled to the memory. In one embodiment, the operations performed by the at least one processing core comprise storing final hashes of each BCA section of a run-time IST (RIST) image for the at least one of the plurality of ICs of the server of the data center in write-protected portion of the memory; receiving at least one Public Key Authentication (PKA) signature; authenticating the at least one PKA signature using a PKC algorithm; once the PKA signature is authenticated, using the final hash for each BCA section to authenticate a portion of the at least one of the plurality of ICs of the server of the data center RIST image associated with each BCA section using a hash engine of the at least one processing core skipping any PKA signature checks for any of the final hashes; and testing portions of the at least one of the plurality of ICs of the server of the data center with the authenticated RIST image portion for the at least one processing core of the server of the data center.

BRIEF DESCRIPTION OF THE DRAWINGS

Reference is now made to the following descriptions taken in conjunction with the accompanying drawings, in which:

FIG. 6 illustrates a flow diagram of an example method of using a single PKC/RSA authentication of final hashes for BCA chains which are then authenticated to assemble a test image to be used during RIST testing on the IC according to principles of the disclosure.

DETAILED DESCRIPTION OF THE DISCLOSURE

Figure 1:
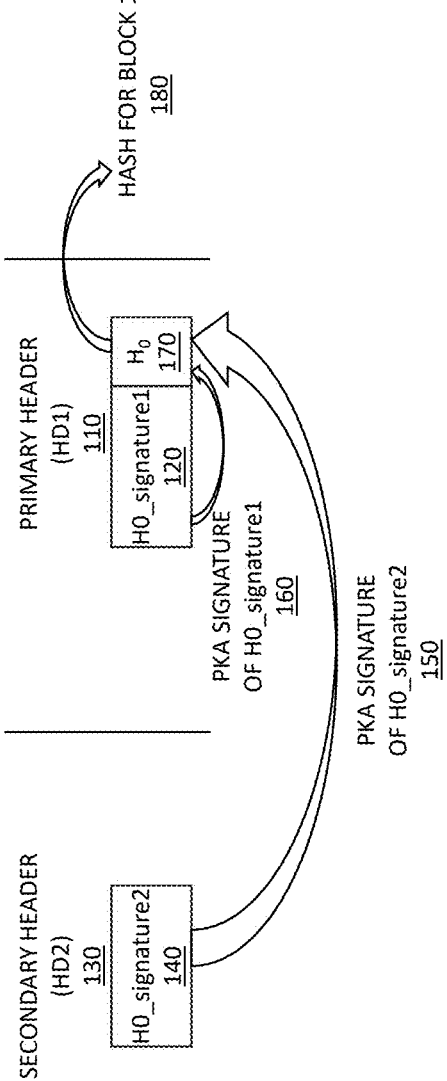
FIG. 1 illustrates an example of a method for multi-party, multiple signature authentication according to principles of the disclosure.
Figure 1:
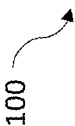

BCA typically uses a complete test sequence that is a non-modifiable, single stream of data. In IST applications, the test sequence is rarely a fixed, single stream event. Rather, it is composed of multiple types of tests, each with slightly different targets. Depending on specific requirements, one or more of these tests are executed. Since the solution space is very large, creating a single BCA chain for all combinations is not sustainable. In some embodiments, a solution to this problem is to use multiple BCA chains, one per specific test sequence, each with its own authentication signature. This makes the multiple BCA chains independent test pieces and allows scalable creation of any number of combinations. For large ICs with many types of tests, the number of BCA signatures for the multiple BCA chains can quickly add up to hundreds or more. Tracking and maintenance of all of these BCA signatures becomes very difficult when such BCA signatures are created per device and when there are millions of such devices, each having hundreds of BCA signatures.

In many embodiments, during RIST, if CPU processing cores are physically identical, they can share main test data. However, sharing the same initialization and test result fetching sequences is difficult because their relative locations on test structures on the IC are different. Thus, each CPU are typically addressed uniquely, which can result in some restrictions while using BCA. For example, either test data can be dedicated for each processing core or the BCA chains can be broken into multiple sections so that unique parts can have their own BCA signature and common parts can be shared. In some embodiments, the common portions of the test data sequence constitutes more than 95% of the test data. Replicating test data n times for n CPU processing cores is challenging and, in some cases, not feasible, at least for the reasons discussed above. For example, DRAM space dedicated for RIST image storage minimizes the ability to use images unique to each CPU processing core. Hence, sharing common data would be beneficial wherein multiple BCA chains are used.

Another issue with using multiple BCA signatures is the time it takes to run BCA signature checks for each of the multiple BCA chains. BCA is composed of hash calculations and a signature check using, e.g., an encryption algorithm such as an asymmetric encryption algorithm. In many embodiments, the encryption algorithm is a public key authentication (PKA) algorithm that uses a Public Key Cryptography (PKC) system to perform a PKA signature check. In some embodiments, the PKC system uses a Rivest-Shamir-Adleman (RSA) algorithm that can be used to perform the PKA signature check for BCA and is used herein as an example. In some embodiments, hash calculations can be arbitrarily scaled by using multiple hash calculation engines to match a desired throughput. However, the same cannot be done for PKA (e.g., RSA) signature checks for the following reasons: (i) PKA signature check calculations are very time consuming and (ii) PKA signature check calculation engines are usually very large.

If all BCA chains could be collapsed to use a single authentication signature, i.e., a single PKA signature, the overhead required to test ICs with many types of tests, each with specific BCA signatures for specific devices of the IC, would allow the IC to meet stringent testing requirements, e.g., the automotive testing requirements described above.

This disclosure provides circuitry and a method of using this circuitry to require only a single signature, e.g., a single PKA signature, to authenticate multiple BCA chains rather than conventionally having to authenticate each BCA chain separately. Final hashes of each BCA section of an IST image are stored in a write-protected memory. At least one PKA signature (e.g., an RSA signature) is received. The at least one PKA signature is then authenticated using the PKC system encryption algorithms (e.g., an RSA encryption algorithm). Once the at least one PKA signature is authenticated, a final hash for each BCA section is used to authenticate a portion of the IST image associated with each BCA section using a hash engine, skipping the need for any further PKA signature checks for any of the final hashes. At this point, portions of an IC are tested with the authenticated IST image portion.

As discussed above, not only does the IC need to be tested to confirm there are no structural faults by the IC manufacturer, the IC also needs to be tested after the IC has been placed in the application and is performing its function in that application. In most cases, the IC manufacturer has proprietary information on the IC that the IC manufacturer does not want either a competitor or the end customer of the IC to be able to discover. Moreover, the end customer may want to include proprietary information on the IC that cannot be discovered as well. To address this concern, support for multi-party authentication with multiple signatures is provided.

Referring to the drawings, specifically FIG. 1, an example of a method 100 for this multi-party, multiple signature authentication according to principles of the disclosure is shown. A header block, e.g., primary header block 110, contains a unique digital signature 120, e.g., H0_signature 1, for one party, in this example the end customer. Another header block, e.g., secondary header block 130, contains another unique digital signature 140, e.g., H0_signature 2, for another party, in this example the IC manufacturer. Using PKA signatures, authentication rights can be delegated from the IC manufacturer to the end customer without the end customer (or competitor) being able to discover information proprietary to the IC manufacture. As depicted in FIG. 1, both PKA signature 150 (e.g., for the IC manufacturer) and PKA signature 160 (e.g., for the end customer) is used to authenticate a hash, e.g., $H_0$ 170, where the authenticated hash, e.g., $H_0$ hash 170 is then sent along, in step 180, to a first block, e.g., Block 1, of the block chain containing an IST image to be authenticated by the end customer. Here, authentication rights are delegated from one party (e.g., the IC manufacturer) to a new party (e.g., the end customer), in which case a new signature is generated and the old one is dropped from a list after the verification keys have been replaced.

In conventional methods, the integrity of a test image, e.g., for IST, is protected by a BCA scheme. To handle large amounts of test data in the test image, the data is split into data blocks, e.g., data blocks of 4 KB size, and connected in the block chains. Any change in the authenticated test image leads to an authentication error. As discussed above, these conventional methods us a separate BCA chain for each test type and each processing core for flexibility. To accomplish the authentication, each block in the separate block chains contains a hash of a previous block after the hash of the top-level block is PKA authenticated either with a single PKA signature or, as discussed above, with multiple PKA signatures for multiple parties. Hash dependency creates a chain of hashes and blocks. If there is any change in any part of the authenticated test-image, the hash value corresponding to that block will change, and it will trigger a chain of hash value mismatches, eventually invalidating the signature. In some embodiments, this BCA authentication scheme is implemented by a controller, e.g., either in hardware, software, or a combination thereof.

In many embodiments, authentication of the IST image is a combination of an PKA (in this specific case RSASSA-PSS 3K) and a cryptographic hashing function (in this specific case SHA3-256) algorithms. As noted above, performing the PKA authentication, e.g., the RSASSA-PSS authentication, when there a many, many block chains, e.g., for the separate block chains for differing test types and processing cores, PKA authentication for each separate block chain is lengthy and expensive and is unfeasible given constraints for many different types of applications, e.g., autonomous driving and data center applications.

As disclosed above, this disclosure provides circuitry and a method of using this circuitry to require only a single signature to authenticate multiple BCA chains rather than conventionally having to authenticate each BCA separately. Once a BCA header hash value (e.g., $H_0$) is authenticated by the required signatures (e.g., either the above-disclosed multi-party authentication scheme with two parties or the above-disclosed single party authentication scheme with one signature) and placed in a write-protected storage, the $H_0$ header hash value can then be trusted for any future execution of IST or RIST. Hence, if a list of all hash values (i.e., "hash_list") for all BCA chains is authenticated, each hash value in that write-protected list can be trusted and PKA authentication of signatures corresponding to those hash values can, unlike the above-described conventional method, be skipped, thereby avoiding the overhead required by PKA authentication of each separate header hash value. This reduced overhead allows RIST of ICs placed in operation to check and ensure that such ICs are free from structural faults that can occur after the IC is placed in operation during a lifetime of a product using the IC.

Figure 2:
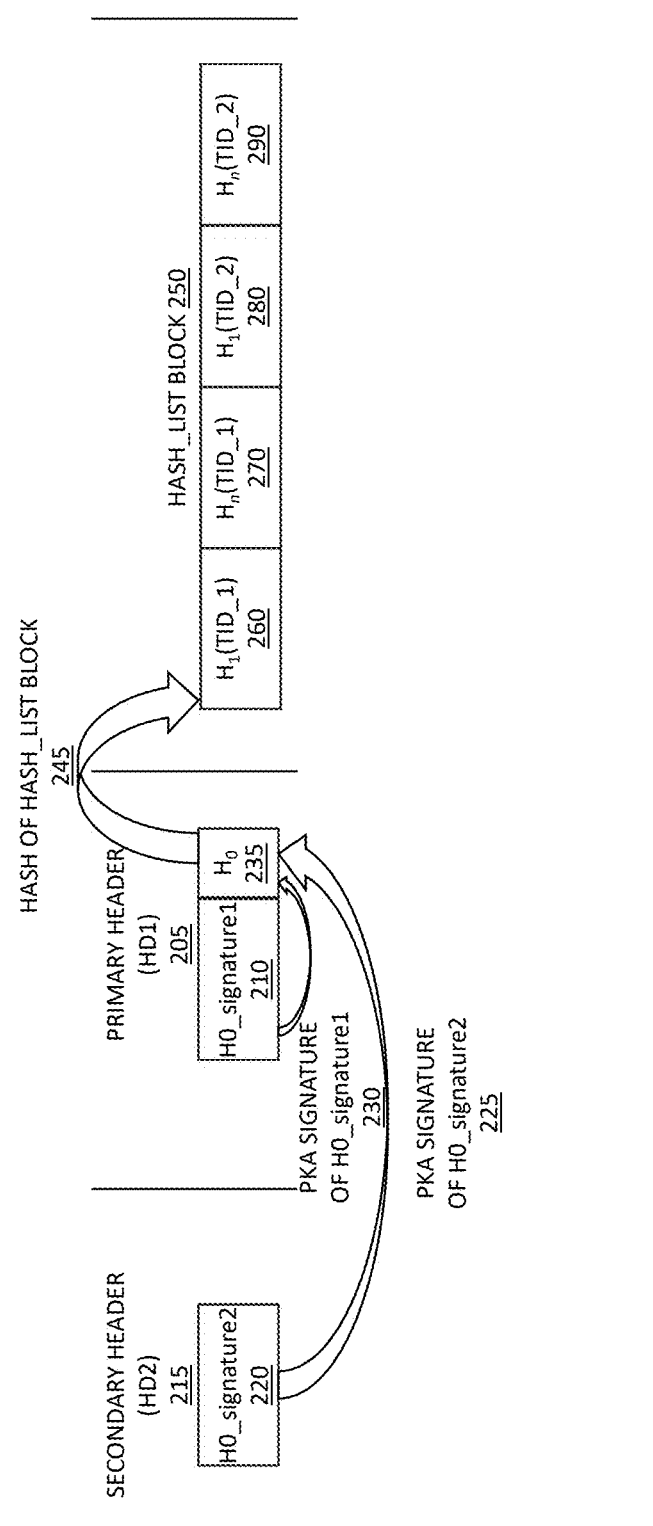
FIG. 2 illustrates an example of a method which utilizes only one signature to authenticate a list of hashes for each BCA across an entire IST image according to principles of the disclosure.

To solve both the above-described latency and signature management issues, the number of signatures required for an entire IST image can be reduced to just one signature by implementing a caching mechanism to avoid PKA check latency during IST or RIST image execution using the above-disclosed method. FIG. 2 shows an example of a method of using just one signature. As shown in FIG. 2, final hashes of each BCA across an entire IST or RIST image are stored as a separate list in the image and a hash of this list is signed (in many embodiments by the above-disclosed multi-party authentication) by multiple parties. Each BCA will no longer be required to be signed individually.

This list of final hashes for each BCA across an entire IST or RIST image (e.g., the list of hash values in HASH_LIST Block 250) is authenticated before any IST or execution starts. In the case of RIST, during a diagnostic initialization phase, software on an IST controller (e.g., an ARM-based controller) will invoke hardware (on the IST controller or separate from the IST controller) to perform authentication of only the list of hashes for each BCA across the entire IST image. In some embodiments, this authentication of the list of hashes for each BCA takes less than 0.5 mS and the authentication occurs only once per boot cycle.

Upon successful authentication of the list of hashes for each BCA, IST hardware stores each of the hash entries in the list of hashes in an internal cache that cannot be accessed by IST controller software or any other unit of the IC. During IST execution, the IST hardware checks if the hash of the header is present in cache. If the hash of the header is present in the cache, the IST hardware assumes the hash list is already authenticated, skips any PKA check of any of the individual hashes, and continues to perform SHA3-256 checks on the rest of the block in that BCA. If the hash is not present in cache, BCA errors are generated.

RIST uses the concept of a Test Identifier (TID) to store scheduled test sequences in DRAM and pass that information to IST hardware. The complete IST test image that is stored in DRAM is composed of many test sequences, some of which can be shared between CPU processing cores and some are unique to each CPU processing core as discussed above. At the time of a test image creation, an exact sequence of which tests will be applied in which order is not fixed. The images are signed to allow independent test sequences to be executed in any order. Independent from the overall IST image, TID entries specify the exact sequence of tests required to be run for that TID entry. There can be any number of TID entries. For example, TID-1 can be dedicated to running RIST on CPU processing core 1. It can have a sequence of BCAs that may first initialize CPU processing core 1 to be tested, then run the test, and at the end fetch test results and decide a pass/fail status of the test.

FIG. 2 illustrates method 200 which utilizes only one signature to authenticate a list of hashes for each BCA across an entire IST image according to principles of the disclosure. A header block, e.g., primary header block 205, contains a unique digital signature 210, e.g., H0_signature 1, for, e.g., an end customer. Another header block, e.g., secondary header block 215, contains another unique digital signature 220, e.g., H0_signature 2, for, e.g., an IC manufacturer. As depicted in FIG. 2, both PKA signature 225 for, e.g., the IC manufacturer, and PKA signature 230 for, e.g., the end customer, is used to authenticate a hash, e.g., $H_0$ 235, of a hash list block, e.g., Hash of Hash_List Block 245, for hashes for separate BCA chains, e.g., Hash_List Block 250 where Hash_List Block 250 includes hashes for separate BCA chains. As depicted in FIG. 2, these separate BCA chains include a hash for a first block chain of TID_1, e.g., $H_1(TID\_1)$ 260, through a hash for the nth block chain of TID_1, e.g., Hn(TID_1) 270, and a hash for a first block chain of TID_2, e.g., $H_1(TID\_2)$ 280, through a hash for the nth block chain of TID_2, e.g., Hn(TID_2) 290.

If the number of values in the hash list, e.g., Hash_List Block 250 of FIG. 2, is very large, it may not be possible to store all of the hash values in a local cache in the IST hardware. To make this scheme more scalable, the IST hardware is initially provided with a start index, e.g., start_index, which indicates from which hash location onwards the IST hardware will start caching hash values. The IST hardware then stores all hash values starting from that index until the local cache is full. At the same time, the IST hardware also stores the hash of the list of hashes, e.g., $H_0$ 235 of FIG. 2, as a trusted value for future reference. This allows the IST hardware to not have to run RSA signature checks again when the local cache needs to be dynamically refreshed to store a different range of hash values.

Figure 3:
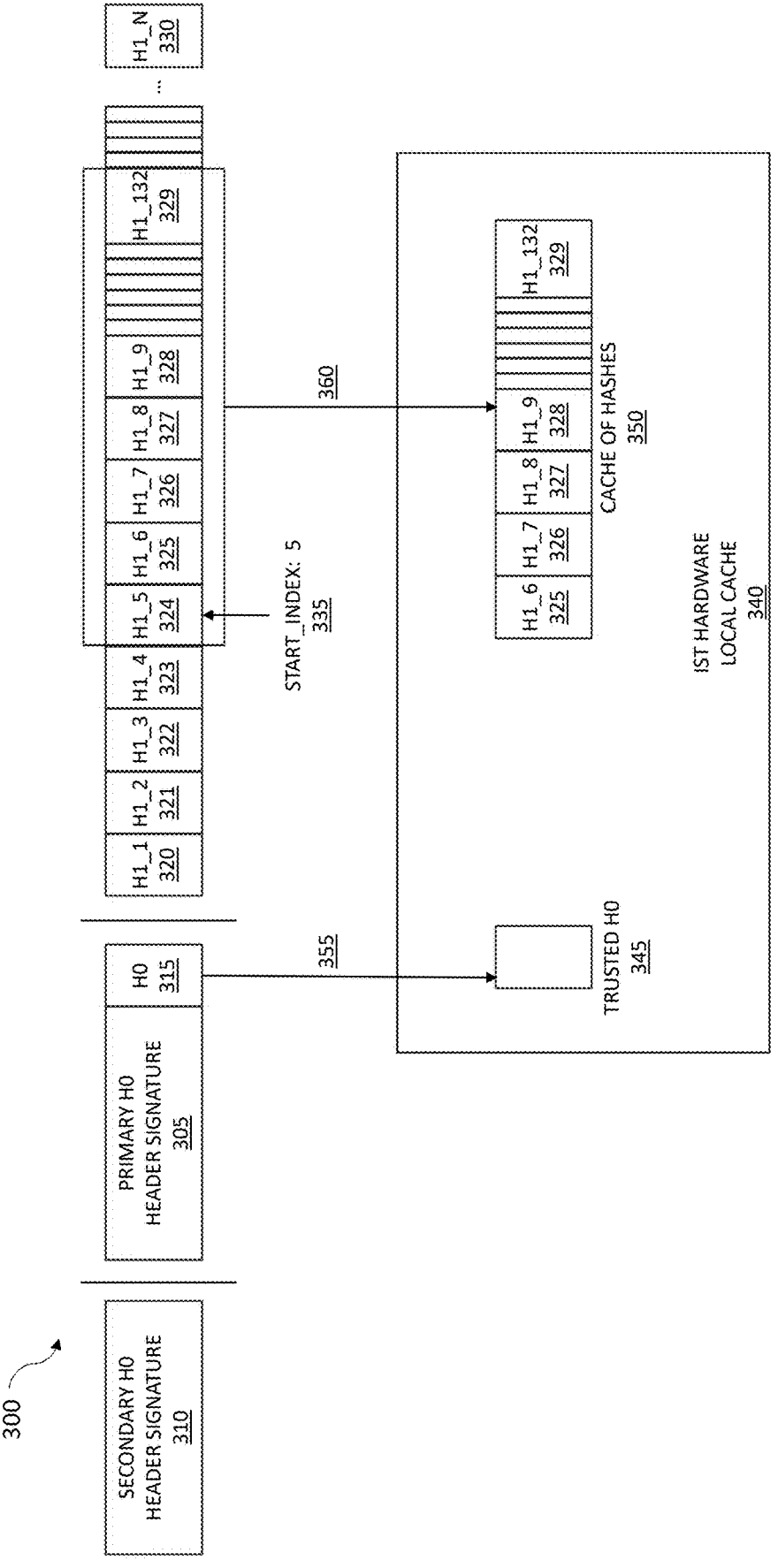
FIG. 3 illustrates an example of a method initially indexing locations in a local cache of IST hardware according to principles of the disclosure.

FIG. 3 illustrates an example of a method 300 initially indexing locations in a local cache of IST hardware according to principles of the disclosure. The cache of FIG. 3 depicts 128 cache locations. However, in other embodiments the cache of the IST hardware can include fewer or greater cache locations. As with FIGS. 1-2, FIG. 3 also uses a multi-party, multi-signature authentication to generate an authenticated hash $H_0$, e.g., $H_0$ 315, from a primary header, e.g., primary $H_0$ header signature 305, and a secondary header, e.g., secondary $H_0$ header signature 310. Upon successful signature validation, $H_0$ is stored locally for future reference. As discussed above, the IST hardware is provided a start index, e.g., start_index 335. In the example in the embodiment of FIG. 3, the start index is 5. Of course, the start index could be any value. In the example in the embodiment of FIG. 3, as noted above, the local cache can hold 128 hashes. Thus, in this example, the hashes starting from the fifth location, e.g., HI_5 (324), through the $132^{nd}$ location, e.g., HI_132 (329), are stored in the cache of hashes of the IST hardware local cache, e.g., cache of hashes 350 of IST hardware local cache 340. Hashes H1_1 (320) through H1_4 (323) are not stored in cache of hashes 350 of IST hardware local cache 340. Prior to loading cache of hashes 350 in IST hardware local cache 340 in step 360, the trusted $H_0$ 345 is stored in IST hardware local cache 340 in step 355.

When a requested hash value cannot be found in the local cache, the IST hardware automatically clears the local cache and triggers re-fetching from an external storage device (e.g., DRAM or flash drive) of the complete hash list. As with the method of FIGS. 1-3, after verifying that $H_0$ matches a trusted $H_0$ valued and recalculating $H_0$ for the reloaded list, if the IST hardware finds a match for a hash value anywhere in the complete hast list, a new range of hash values are stored in the local cache of the IST hardware, where the start index, e.g., start_index, is auto adjusted to approximately center the hash value match location. If no match can be found, a BCA error is issued. Even though there is a latency to reload the cache so that the hash is located in the cache, this latency is far less (e.g., less than 1%) than the time it would take to check PKA signatures to revalidate the hashes.

Figure 4:
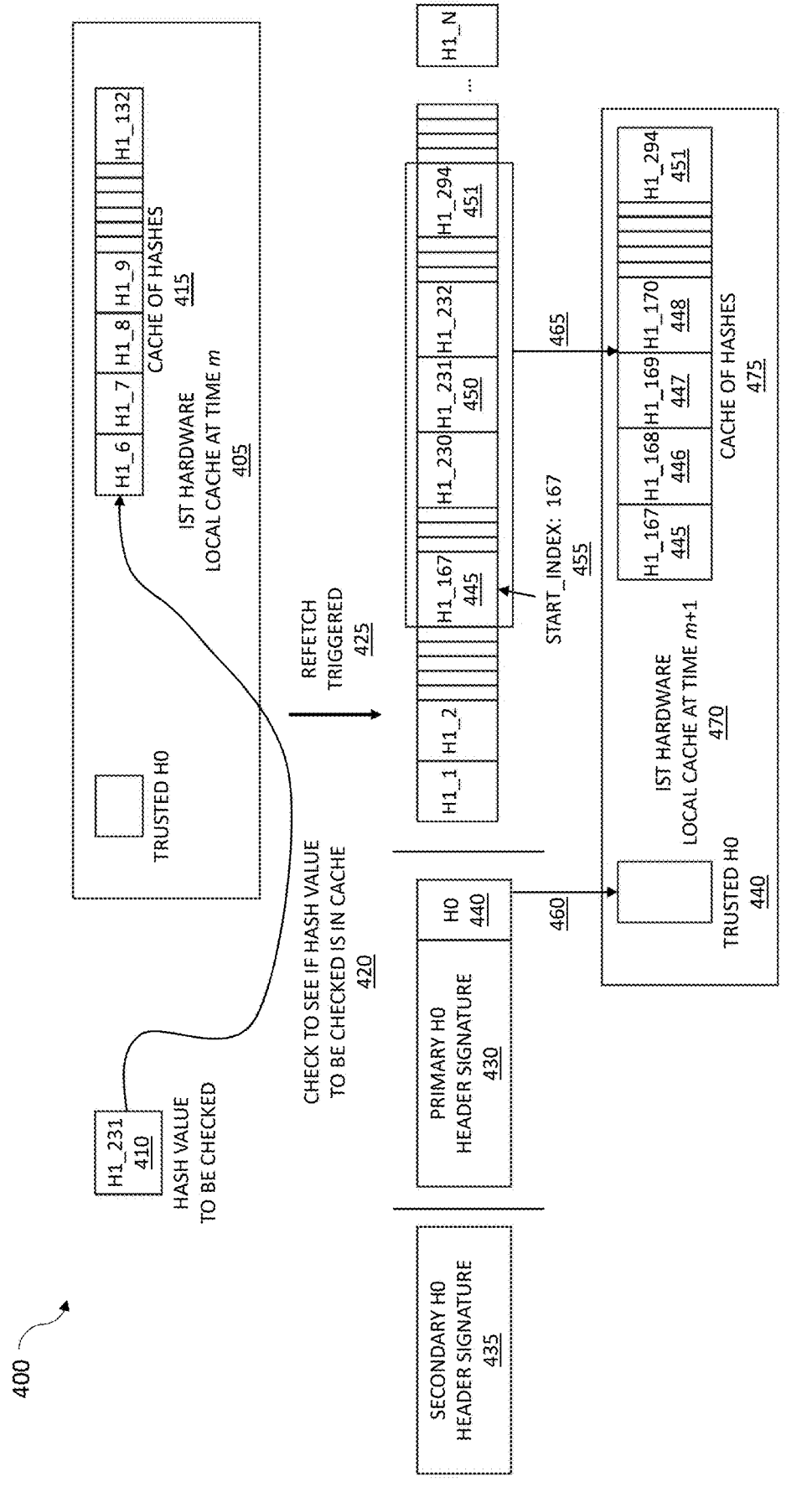
FIG. 4 illustrates an example of a method of auto adjusting a start index when the requested hash is not located in the local cache of the IST hardware according to principles of the disclosure.

FIG. 4 illustrates an example of a method 400 of auto adjusting a start index when the requested hash is not located in the local cache of the IST hardware according to principles of the disclosure. As with the local cache 340 of the IST hardware of FIG. 3, the local cache of the IST hardware of FIG. 4 (e.g., local caches 405 and 470) also has 128 cache locations (however, in other embodiments the cache of the IST hardware can include fewer or greater cache locations). As with FIGS. 1-3, FIG. 4 also uses a multi-party, multi-signature authentication to generate an authenticated hash $H_0$, e.g., $H_0$ 440, from a primary header, e.g., primary $H_0$ header signature 430, and a secondary header, e.g., secondary $H_0$ header signature 435. Upon successful signature validation, $H_0$ is stored locally for future reference.

In the embodiment of the method of FIG. 4, a hash value to be checked is determined. In the example method shown in FIG. 4, this hash value is H_231 (410). Of course, the requested hash value could be any other hash value. In the method of FIG. 4, the hash value 410 is checked to see if it exists in cache of hashes 415 of the IST hardware local cache, e.g., IST hardware local cache at time m 405, in step 420. If the hash value to be checked, e.g., hash value 410, exists in the IST hardware local cache, e.g., local cache at time m 405, the contents of the local cache, e.g., local cache at time m 405, can be indexed such that the cache of hashes in the local cache are centered around the hash value to be checked, as described above in FIG. 3. However, if the hash value to be checked, e.g., hash value 410, does not exist in the IST local hardware local cache, e.g., local cache at time m 405, a re-fetch of the local cache is performed at step 425.

When the local cache, e.g., local cache at time m 405, is to be re-fetched, the local cache is cleared and hash values from the external device described above is loaded into the local cache at an incremented time, e.g., IST hardware local cache at time m+1 470. The start index of the hash values re-fetched, e.g., start_index 455, is auto adjusted so that the requested hash value, e.g., hash value 410 (now depicted at location 450), is centered in the local cache, e.g., IST hardware local cache at time m+1 470, in step 465. These hash values re-fetched in step 465 are a new cache of hashes, e.g., cache of hashes 475. In the example of FIG. 4, the first hash value (e.g., hash value H1_167) is located in location 445 of cache of hashes 475, the second hash value (e.g., hash value H1_168) is located in location 446 of cache of hashes 475, the third hash value (e.g., hash value H1_169) is located in location 447 of cache of hashes 475, the fourth hash value (e.g., hash value H1_170) is located in location 448 of cache of hashes 475, and the last hash value (e.g., hash value H1_294) is located in location 451 of cache of hashes 475.

In the example of FIG. 4 where the requested hash value to be checked, e.g., hash value 410, has a value of H1_231, the start_index is hash value H1_167. With 128 cache locations in the local cache, e.g., local cache at time m+1, the starting hash value is 64 hashes (128÷2) before requested hash value to be checked H1_231, or hash value H1_167 stored in location 445, the requested hash value to be checked is hash value H1_231 stored at location 450, and the last hash value is stored 63 hashes after the requested hash value to be checked (e.g., hash value H1_231), or hash value H1_294 stored in location 451. Thus, the start_index, e.g., start_index 455, is hash value H1_167 stored in location 445. Prior to loading cache of hashes 475 in IST hardware local cache 470 in step 465, the trusted $H_0$ 440 is stored in IST hardware local cache 470 in step 460. When the range of hash values needed during each boot is larger than the local cache size, auto adjusting indexing is needed.

Both the indexing method of the embodiment of FIG. 3 and the auto adjusting indexing method of FIG. 4 are needed when the number of separate block chains, and their corresponding hash values, is very large. In some embodiments, the number of separate block chains, and their corresponding hash values, is even too large for the above-disclosed auto adjusting index. In these embodiments a different method is needed. In some embodiments, this different method employs the use of Merkel trees as the use of Merkel trees shows benefit greater than that of auto adjusting indexing. In an embodiment of this different method, the list of hashes can be structured in a more efficient way to group the hash values into convenient categories where the Merkle tree makes the overall hash calculation and re-calculation scheme faster. In this scheme, only one category of hashes is stored at any given time (usually constrained by a threshold area of the memory), but re-calculation can be done much faster since the re-fetching and re-calculation can focus on known groups only. Furthermore, especially during initialization, multiple hash calculations can be executed in parallel to further reduce calculation time.

Figure 5:
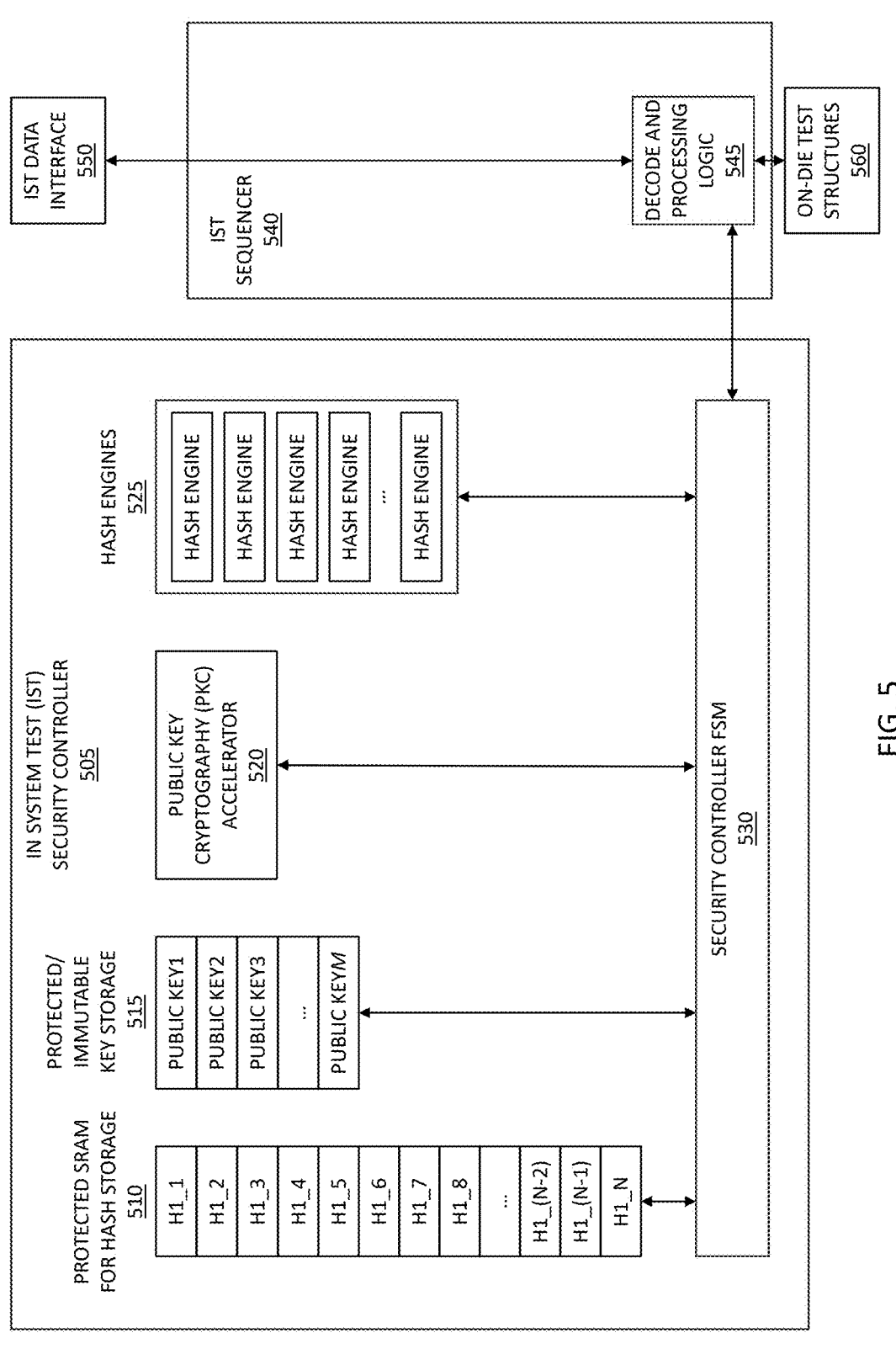
FIG. 5 illustrates a circuit diagram of an example of IST hardware according to principles of the disclosure.

FIG. 5 illustrates a circuit diagram of IST hardware 500 according to principles of the disclosure. For example, IST hardware 500 performs, inter alia, the above-disclosed multi-party, multi-PKC authentication using a PKA algorithm of a PKC encryption system and specifying exact test sequences to be scheduled using TID entries for a test image for either a single CPU processing core or multiple CPU processing cores, thereby performing authentication only once for the list of hashes for each BCA across the entire IST image. Once IST hardware 500 performs the PKA authentication, it then, based on the scheduled TID sequences, uses hash engines of IST hardware 500 to authenticate a respective portion of the IST image associated with each BCA section using a final hash for each BCA section (skipping PKA checks for any of these final hashes). Further, IST hardware 500 includes logic and storage to assemble and store final hashes for BCA chains according a corresponding TID. The assembly and storage of these final hashes are performed according to the methods disclosed above. At this point, portions of the IC are tested (during RIST) with the authenticated IST image portion.

As shown in FIG. 5, IST hardware 500 comprises IST security controller 505 and IST sequencer 540. IST security controller 505 comprises protected SRAM 510 for storing final hashes of BCA chains, protected/immutable key storage 515 for storing PKA keys, PKC accelerator 520 used in the single authentication disclosed above, hash engines 525 used to authenticate data in the BCA chains (using, e.g., SHA3-256 cryptographic hashing function algorithms), and security controller 530 in the form of, e.g., a finite state machine (FSM) used to control other portions of IST security controller 505 to perform the methods disclosed above (e.g., PKC authentication, storage of final hashes for BCA chains and authentication of the data in the BCA chains using cryptographic hashing function algorithms). IST hardware 500 further comprises IST sequencer 540 which comprises decode and processing logic 545 to assemble the final hashes according to TIDs as disclosed above. IST sequencer 540 is communicatively coupled with data interfaces 550 (e.g., PCIe, UFS, USB, etc.) to communicate with other portions of the IC under RIST (e.g., inter alia, flash memory and/or DRAMs). IST sequencer 540 is also communicatively coupled with on-die test structures 560 (e.g., inter alia, JTAG, SCAN, MBIST, etc. structures) to test the IC during RIST with the authenticated IST image portions. While the embodiment of FIG. 5 depicts IST security controller 505 and IST sequencer 540 as separate functions of IST hardware 500, they could be a single function of IST hardware 500.

FIG. 6 illustrates a flow diagram 600 of an example method of using a single PKC/RSA authentication of final hashes for BCA chains which are then authenticated to assemble a test image to be used during RIST testing on the IC according to principles of the disclosure. This method starts at step 610. At step 620, final hashes of each BCA section of an IST is stored in a write-protected portions of a memory of an IC (e.g., in protected SRAM 510 of IST security controller 505 of IST hardware 500 as disclosed above). At step 630, at least one PKA signature is received (e.g., by IST security controller 505 of IST hardware 500 as disclosed above). As disclosed above, multiple PKA signatures may be received for multi-party authentication. At step 640, a determination of whether the received PKA signature(s) are authenticated is made (e.g., with PKC accelerator 520 using public keys stored in protected/immutable key storage 515 of IST security controller 505 of IST hardware 500 as disclosed above). If the PKA signature is not authenticated (by, e.g., IST hardware 500), the method proceeds to step 670 where method 600 stops. If the PKA signature is authenticated, the method proceeds to step 650 where final hashes for each BCA section are used to authenticate a corresponding portion of the IST image associated with the BCA section (using, e.g., cryptographic hashing function algorithms, e.g., the SHA3-256 cryptographic hashing function algorithm, in hashing engines 525 of IST security controller 505 of IST hardware 500). At step 660, portions of the IC are tested with the authenticated IST image portions (using, e.g., RIST).

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein. The data storage media can be part of or associated with the digital data processors or computers.

The digital data processors or computers can be comprised of one or more GPUs, one or more CPUs, one or more of other processor types, or a combination thereof. The digital data processors and computers can be located proximate each other, proximate a user, in a cloud environment, a data center, or located in a combination thereof. For example, some components can be located proximate the user and some components can be located in a cloud environment or data center.

The GPUs can be embodied on a single semiconductor substrate, included in a system with one or more other devices such as additional GPUs, a memory, and a CPU. The GPUs may be included on a graphics card that includes one or more memory devices and is configured to interface with a motherboard of a computer. The GPUs may be integrated GPUs (iGPUs) that are co-located with a CPU on a single chip. Configured or configured to means, for example, designed, constructed, or programmed, with the necessary logic and/or features for performing a task or tasks.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Configured or configured to means, for example, designed, constructed, or programmed, with the necessary logic and/or features for performing a task or tasks. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

What is claimed is:

1. An integrated circuit (IC) comprising:
a memory; and
at least one processing core, operatively coupled to the memory to perform operations comprising:
    storing final hashes of each block chain authentication (BCA) section of an in-system test (IST) image in a write-protected portion of the memory;
    receiving at least one Public Key Authentication (PKA) signature;
    authenticating the at least one PKA signature using a public key cryptography (PKC) algorithm;
    once the PKA signature is authenticated, using the final hash for each BCA section to authenticate a portion of the IST image associated with each BCA section while skipping PKA signature checks for any of the final hashes; and
    testing portions of the IC with the authenticated IST image portion.

2. The IC as recited in claim 1, wherein there are multiple PKA signatures received and authenticated.

3. The IC as recited in claim 1, wherein when a number of final hashes of each BCA section of the IST image is greater than a threshold area of the memory, the operations further include indexing a set of the final hashes of each BCA section of the IST image that fits within the threshold area of the memory.

4. The IC as recited in claim 3, wherein when a requested final hash for a BCA section of the IST image is not within the indexed set of final hashes, the operations further include re-fetching another set of final hashes which includes the requested final hash for the BCA section of the IST image and loading a new indexed set of final hashes centered around the requested final hash for the BCA section of the IST image that fits within the threshold area of the memory.

5. The IC as recited in claim 1, wherein when a number of final hashes of each BCA section of the IST image is greater than a threshold, the operations further include categorizing the final hashes of each BCA section of the IST image and selecting, using a Merkle tree, a set of final hashes of each BCA section of the IST image that fits within a threshold area of the memory.

6. The IC as recited in claim 1, wherein the IST is a run-time IST where some portion of the IC is tested while the rest of the IC continues its functional operation.

7. The IC as recited in claim 1, wherein the IST image comprises a plurality of test sequences, some of which are shared between other processing cores of the at least one processing core.

8. The IC as recited in claim 7, wherein at least one of the plurality of test sequences has a different order than other ones of the plurality of test sequences.

9. The IC as recited in claim 7, wherein a test identifier (TID) stores scheduled sequences of the plurality of test sequences.

10. The IC as recited in claim 1, wherein the PKC algorithm is a Rivet-Shamir-Adleman (RSA) algorithm.

11. A method comprising:
    storing final hashes of each block chain authentication (BCA) section of an in-system test (IST) image for an integrated circuit (IC) in a write-protected portion of a memory of the IC;
    receiving at least one Public Key Authentication (PKA) signature;
    authenticating the at least one PKA signature using a public key cryptography (PKC) algorithm;
    once the PKA signature is authenticated, using the final hash for each BCA section to authenticate a portion of the IST image associated with each BCA section while skipping PKA signature checks for any of the final hashes; and
    testing portions of the IC with the authenticated IST image portion.

12. The method as recited in claim 11, wherein there are multiple PKA signatures received and authenticated.

13. The method as recited in claim 11, wherein when a number of final hashes of each BCA section of the IST image is greater than a threshold area of the memory, further comprising indexing a set of the final hashes of each BCA section of the IST image that fits within the threshold area of the memory.

14. The method as recited in claim 13, wherein when a requested final hash for a BCA section of the IST image is not within the indexed set of final hashes, further comprising re-fetching another set of final hashes which includes the requested final hash for the BCA section of the IST image and loading a new indexed set of final hashes centered around the requested final hash for the BCA section of the IST image that fits within the threshold area of the memory.

15. The method as recited in claim 11, wherein when a number of final hashes of each BCA section of the IST image is greater than a threshold, further comprising categorizing the final hashes of each BCA section of the IST image and selecting, using a Merkle tree, a set of final hashes of each BCA section of the IST image that fits within a threshold area of the memory.

16. The method as recited in claim 11, wherein the IST is a run-time IST where some portion of the IC is tested while the rest of the IC continues its functional operation.

17. The method as recited in claim 11, wherein the IST image comprises a plurality of test sequences, some of which are shared between processing cores of IC.

18. The method as recited in claim 17, wherein at least one of the plurality of test sequences is ordered differently than other ones of the plurality of test sequences.

19. The method as recited in claim 17, wherein a test identifier (TID) stores scheduled sequences of the plurality of test sequences.

20. The method as recited in claim 11 wherein the PKC algorithm is a Rivet-Shamir-Adleman (RSA) algorithm.

21. A non-transitory computer-readable storage medium comprising instructions that, when executed by a processing device, cause the processing device to perform operations comprising:

storing final hashes of each block chain authentication (BCA) section of an in-system test (IST) image for an integrated circuit (IC) in a write-protected portion of a memory of the IC;

receiving at least one Public Key Authentication (PKA) signature;

authenticating the at least one PKA signature using a public key cryptography (PKC) algorithm;

once the PKA signature is authenticated, using the final hash for each BCA section to authenticate a portion of the IST image associated with each BCA section while skipping PKA signature checks for any of the final hashes; and testing portions of the IC with the authenticated IST image portion.

22. An autonomous driving system comprising a plurality of integrated circuits (ICs), wherein at least one of the plurality of ICs comprises:

a memory; and at least one processing core, operatively coupled to the memory to perform operations comprising:

storing final hashes of each block chain authentication (BCA) section of an automotive run-time in-system test (RIST) image in a write-protected portion of the memory;

receiving at least one Public Key Authentication (PKA) signature;

authenticating the at least one PKA signature using a public key cryptography (PKC) algorithm;

once the PKA signature is authenticated, using the final hash for each BCA section to authenticate a portion of the automotive RIST image associated with each BCA section while skipping PKA signature checks for any of the final hashes; and testing portions of the at least one of the plurality of ICs with the authenticated automotive RIST image portion.

23. A server of a data center, the server comprising a plurality of integrated circuits (ICs), wherein at least one of the plurality of ICs comprises:

a memory; and at least one processing core, operatively coupled to the memory to perform operations comprising:

storing final hashes of each block chain authentication (BCA) section of a run-time in-system test (RIST) image for the at least one processing core of the server of the data center in a write-protected portion of the memory;

receiving at least one Public Key Authentication (PKA) signature;

authenticating the at least one PKA signature using a public key cryptography (PKC) algorithm;

once the PKA signature is authenticated, using the final hash for each BCA section to authenticate a portion of the RIST image for the at least one processing core of the server of the data center associated with each BCA section while skipping PKA signature checks for any of the final hashes; and testing portions of the at least one of the plurality of ICs with the authenticated RIST image portion for the at least one processing core of the server of the data center.

\* \* \* \* \*